United States Patent [19]

Bushman et al.

[11] Patent Number: 5,256,113
[45] Date of Patent: Oct. 26, 1993

[54] AUTOMOTIVE ACCESSORY DRIVE BELT TENSIONER

[75] Inventors: Thomas S. Bushman, Dearborn; Thomas R. Lahvic, Ann Arbor; Richard J. Meckstroth, Northville; Robert G. Rebandt, II, Romulus; Timothy T. Vaughn, Dearborn, all of Mich.

[73] Assignee: Ford Motor Company, Dearborn, Mich.

[21] Appl. No.: 874,883

[22] Filed: Apr. 29, 1992

[51] Int. Cl.$^5$ ............................................. F16H 7/12
[52] U.S. Cl. ................................... 474/135; 474/188
[58] Field of Search .......................... 474/133-135, 474/152, 153, 188, 189; 242/45, 75; 181/143, 206

[56] References Cited

U.S. PATENT DOCUMENTS

| | | |
|---|---|---|
| 364,878 | 6/1887 | Wilkinson ..................... 474/188 |
| 440,040 | 11/1890 | Jones .......................... 474/188 |
| 447,301 | 3/1891 | Dootson . |
| 543,887 | 8/1895 | Newell ........................ 474/188 |
| 605,104 | 6/1898 | Knoblock ..................... 474/188 |
| 1,841,834 | 1/1932 | McRaven . |
| 1,893,184 | 1/1933 | Smellie . |
| 2,107,812 | 2/1938 | Berry et al. . |
| 2,964,107 | 12/1960 | Walker . |
| 3,080,014 | 3/1963 | Dahl . |
| 3,201,866 | 8/1965 | Parello . |
| 3,602,331 | 8/1971 | Bachorr . |
| 3,948,349 | 4/1976 | Bychinsky . |
| 4,031,761 | 6/1977 | Fisher et al. . |
| 4,145,934 | 3/1979 | Sragal . |
| 4,199,295 | 4/1980 | Raffy et al. . |
| 4,285,676 | 8/1981 | Kraft .......................... 474/135 |
| 4,351,636 | 9/1982 | Hager ......................... 474/135 |
| 4,392,840 | 7/1983 | Radocaj ....................... 474/117 |
| 4,472,162 | 9/1984 | Hitchcock .................. 474/117 X |
| 4,509,933 | 4/1985 | Miranti et al. .............. 474/188 X |
| 4,523,666 | 6/1985 | Murray . |
| 4,557,709 | 12/1985 | St. John ...................... 474/117 |
| 4,696,663 | 9/1987 | Thomey et al. .............. 474/133 |
| 4,822,322 | 4/1989 | Martin ........................ 474/135 |
| 4,832,665 | 5/1989 | Kadota et al. ............... 474/112 |
| 4,908,007 | 3/1990 | Henderson ................... 474/135 |
| 4,934,988 | 6/1990 | Kawamura et al. ......... 474/135 X |
| 4,986,795 | 1/1991 | Storck ........................ 474/188 X |
| 5,131,889 | 7/1992 | Meckstroth et al. ........ 474/135 X |

FOREIGN PATENT DOCUMENTS 2608277 9/1977 Fed. Rep. of Germany .
3043287 6/1981 Fed. Rep. of Germany .
279415 11/1951 France .

Primary Examiner—Ramon S. Britts
Assistant Examiner—Roger J. Schoeppel
Attorney, Agent, or Firm—Jerome R. Drouillard; Roger L. May

[57] ABSTRACT

An arm assembly for an automotive engine accessory drive belt tensioner has a wound spring which is permanently captured upon the arm by a retainer which is effective not only prior to installation of the arm upon an engine, but also after the installation and removal of the arm from an engine.

8 Claims, 3 Drawing Sheets

AUTOMOTIVE ACCESSORY DRIVE BELT TENSIONER

BACKGROUND OF THE INVENTION

Automotive accessory drive belt tensioners are commonly used for maintaining proper tightness of flexible members which power such accessories as a water pump, air conditioning compressor, alternator, and power steering pump. Although many types of tensioners are used, the spring loaded variety is most common.

U.S. Pat. No. 4,832,665 to Kadota et al. discloses a spring type tensioner in which the power spring is immobilized prior to engagement of the tensioner with an engine by means of a pin, 27, which may be extracted after the tensioner is bolted to the engine. A possible problem could occur with the device shown in the '665 patent after pin 27 is extracted. If the tensioner is removed from the engine without reinsertion of pin 27, such as would likely be the case after an engine equipped with the tensioner has been in use for some time, the spring could be allowed to unwind violently. A tensioner arm assembly according to the present invention obviates this problem by controlling the location of the outer and inner ends of the spring not only before the tensioner arm assembly is installed in the engine, but also during and after removal of the arm assembly from an engine.

SUMMARY OF THE INVENTION

A tensioner assembly for an automotive engine accessory drive belt includes a tensioner arm having first and second ends, with a pulley mounted on the first end and a movable bearing section integral with the second end, with the movable bearing section being adapted for engagement with a fixed bearing section carried upon an engine. Such a fixed bearing section may be integral with a cover adapted to enclose part of an engine. The tensioner further includes a wound spring mounted at the second end of the tensioner arm, with the spring having inner and outer ends, and with the inner end being operatively connected with the movable bearing section of the arm. Finally, retainer means at the second end of the arm secures the outer end of the spring such that the outer end is permanently captured within a space defined by the retainer means and the second end of the arm such that the outer end of the spring has limited freedom to move rotationally with respect to the arm, while being restrained against axial movement with respect to the remainder of the arm. The result of the restraint imposed by the retainer means is that the arm may be disengaged from the fixed bearing section without the outer end of the spring becoming disengaged from the second end of the arm.

BRIEF DESCRIPTION OF THE DESCRIPTION

DETAILED DESCRIPTION OF THE INVENTION

Figure 1:
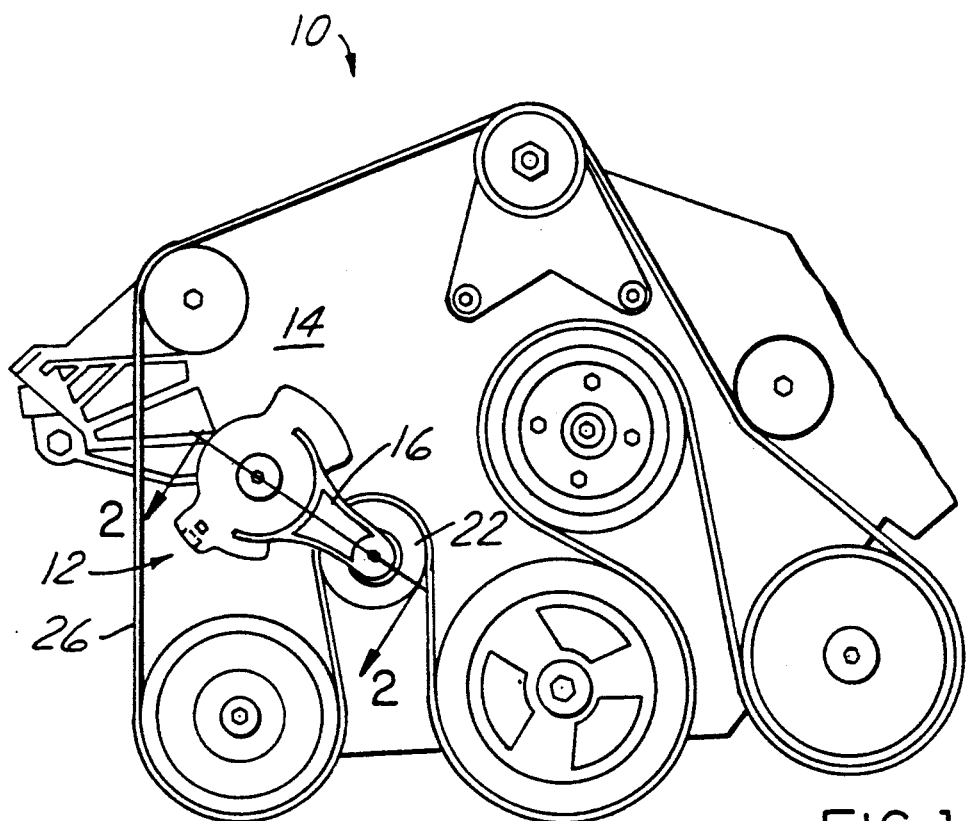
FIG. 1 illustrates an engine having a tensioner assembly according to one aspect of the present invention.
Figure 2:
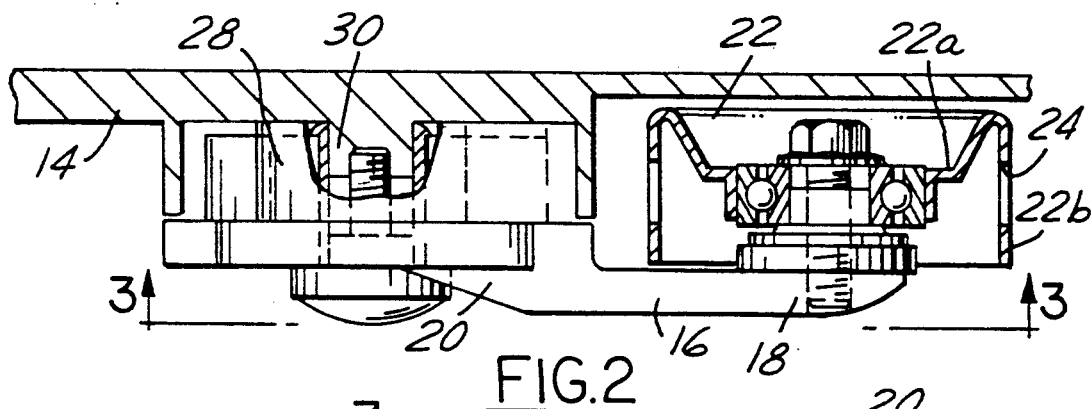
FIG. 2 illustrates a sectional view of a tensioner according to the present invention taken along line 2—2 of FIG. 1.

As shown in FIG. 1, an engine, 10, having an accessory drive belt, 26, is equipped with a belt tensioner, 12, which is applied to a front cover, 14. Continuing with FIG. 2, tensioner arm 16 has first end, 18, to which a belt contacting pulley, 22, is journaled. The second end, 20, of arm 16 includes a movable bearing section, 28, which is supported upon a fixed bearing section, 30, carried upon cover 14. Those skilled in the art will appreciate in view of this disclosure that fixed bearing section 30 need not be integral with the cover of an engine, but could also be a part of a bracket which is bolted to the cover or other part of an engine.

Figure 3:
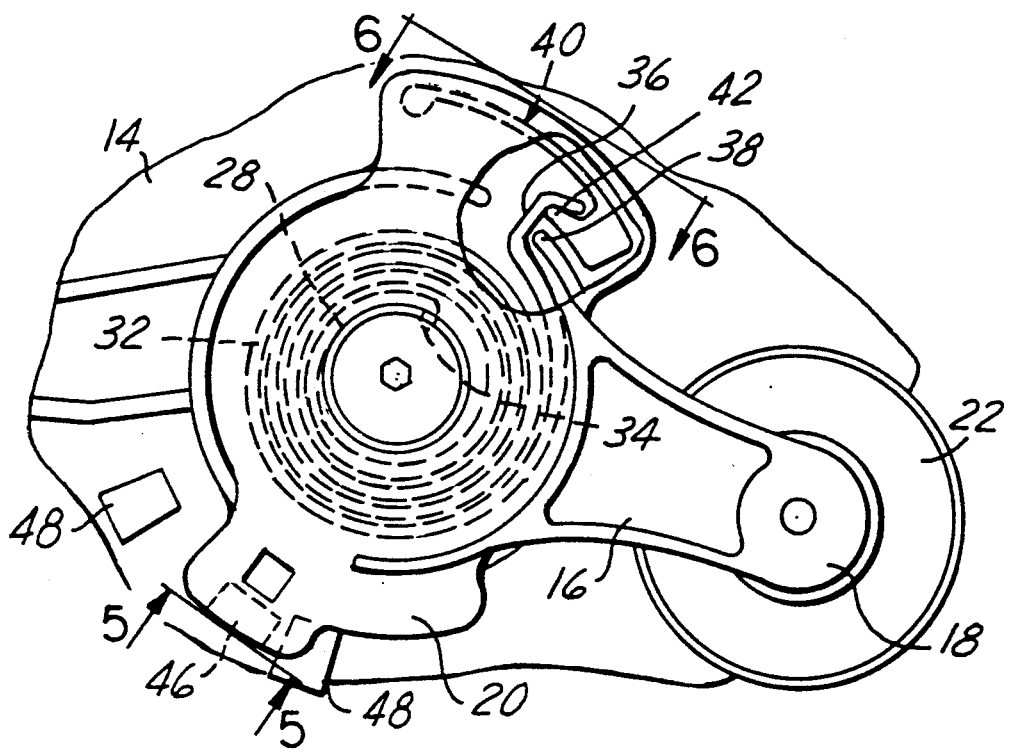
FIGS. 3 and 4 are plan views of a tensioner assembly according to the present invention, shown in two different rotational orientations.
Figure 4:
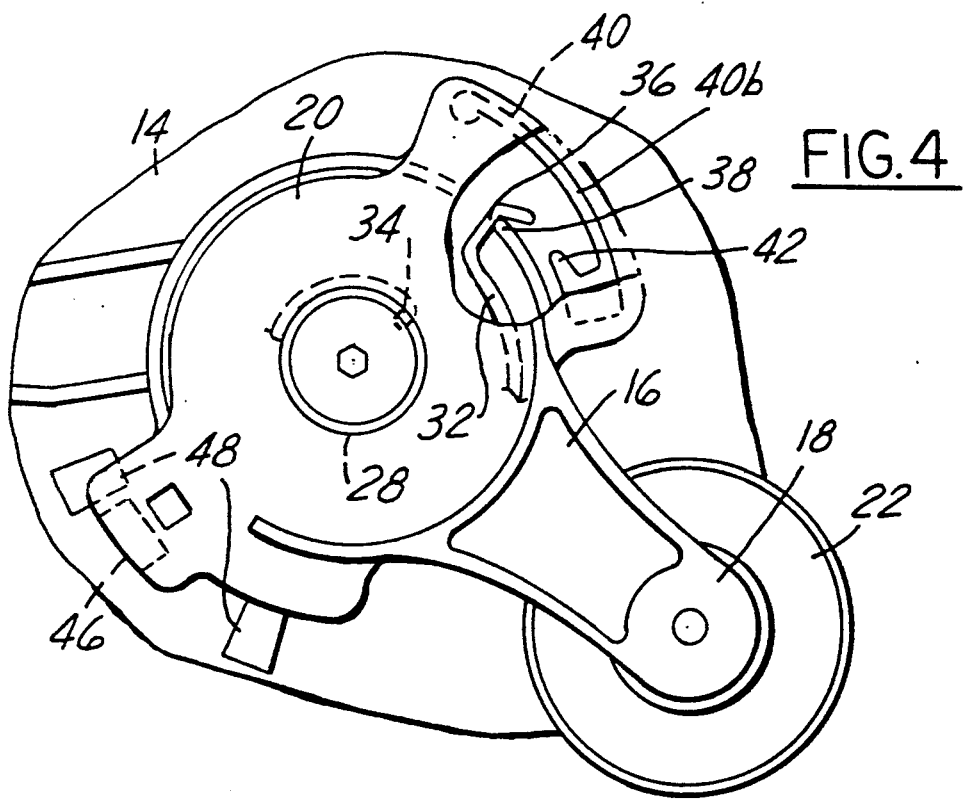

As shown in FIGS. 3 and 4, a tensioner according to the present invention has a wound spring, 32, mounted at second end 20 of arm 16. Spring 32 has an inner end, 34, which is operatively connected with movable bearing section 28. Outer end 36 of spring 32 must of course react with a fixed anchor so as to allow the force of the spring to bias pulley 22 in the direction required to tension belt 26. Accordingly, spring anchor 38 is provided upon cover 14 such that anchor 38 engages outer end 36 of spring 32 and reacts with spring 32 so as to urge end 36 away from abutment 42 of retainer 40.

Prior to installation of the tensioner upon the engine and prior to tensioning of the drive belt, outer end 36 of spring 32 contacts abutment 42, as illustrated in FIG. 3. Unlike prior art spring retainers, retainer 40 is never removed from arm 16, even when the arm has been installed upon an engine. Thus, spring 32 can impose a load upon pulley 22, tending to rotate the tensioner in the counterclockwise direction, as viewed in FIGS. 1, 3 and 4, only after outer end 36 contacts spring anchor 38. Such a position is shown in FIG. 4. It may be seen from FIG. 4 that retainer 40 does not inhibit the operation of spring 32.

Figure 5:
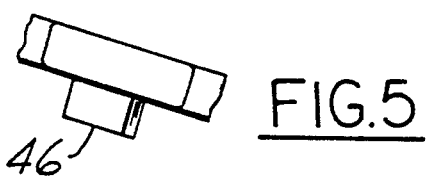
FIG. 5 illustrates a rotational stop boss incorporated into the present tensioner.

FIGS. 3, 4 and 5 illustrate the rotational limitation function of the present tensioner. Accordingly, stop 46 which is part of second end 20 of arm 16 engages stationary stop bosses 48, which are carried upon cover 14. Stop 46 and bosses 48 are arranged such that the rotation allowed by the interaction of the bosses and stop will be less than the rotation allowed spring end 36 by the dimensions of retainer 40. As a result, the spring end 36 will not bottom out on retainer 40 as the tensioner assembly is moved through the rotation allowed by stop 46 and bosses 48.

Figure 6:
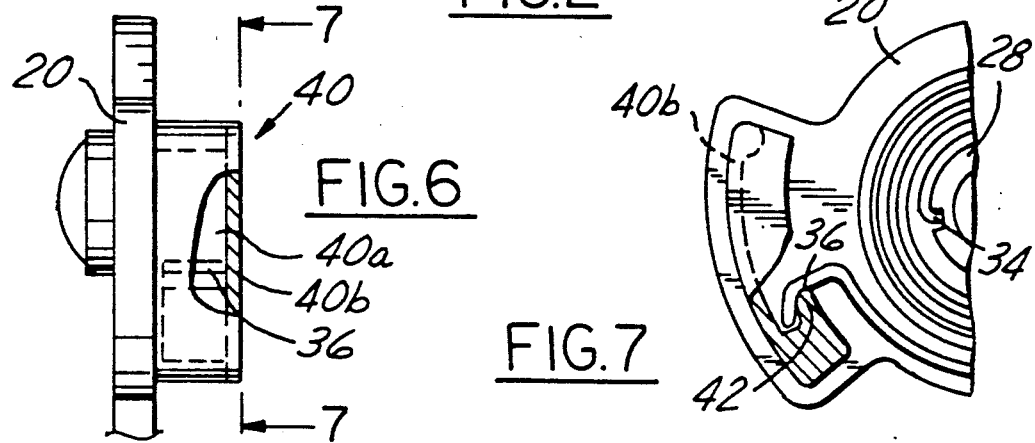
FIGS. 6 and 7 illustrate details of a spring retainer according to an aspect of the present invention.
Figure 7:
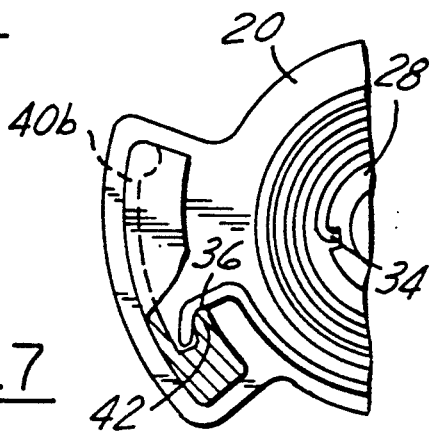

FIGS. 6 and 7 further illustrate the construction of retainer 40. Beginning with FIG. 6, it may be seen that spring end 36 is maintained in axial registry with arm 16 by leg 40b of an L-shaped structure comprising legs 40a and 40b. Leg 40a extends axially along an arc defined by rotational movement of end 36. This is shown in FIG. 7. Leg 40a provides an attachment means for leg 40b. As a whole, retainer 40 prevents spring end 36 from becoming disengaged from arm 16 at any time, either before, or during, or after installation of the arm upon an engine. Retainer 40 also includes abutment 42 which allows spring 32 to be pretensioned before installation upon an engine. As shown in FIGS. 3 and 4, abutment 42 extends a sufficient radius from spring anchor 38 so that spring anchor 38 is able to bear upon end 36. Although a tensioner according to the Present invention has been constructed with retainer 40 riveted in place, those skilled in the art will appreciate in view of this disclosure that retainer 40 may be either cast or otherwise formed as one piece with arm 16, or, alternatively, the retainer may be attached by welding or by other means known in the art and suggested by this disclosure.

Figure 8:
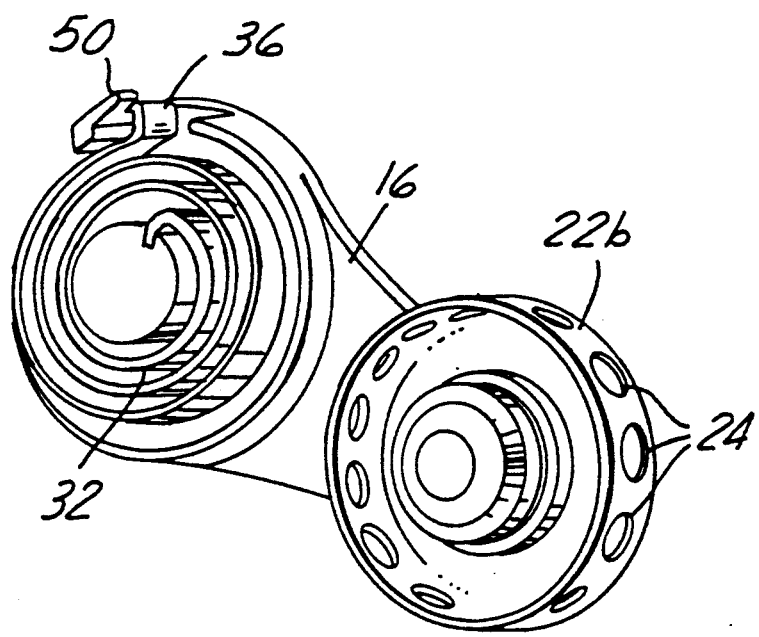
FIG. 8 illustrates a second and third embodiment according to the present invention.

FIG. 8 illustrates another embodiment according to the present invention in which arm 16 has an integral retainer means, 50, which prevents outer end 36 from unwinding and moving axially with respect to arm 16 prior to attachment of the arm to an engine.

It has been determined that the noise characteristics of an engine equipped with a tensioner of the type illustrated may be enhanced by providing a plurality of acoustical apertures, 24, (see FIG. 8), which are equally spaced about rim 22b. The character and level of the sound produced by drive belt 26 as it moves over rim 22b is a function of the diameter of apertures 24. In general, the larger diameter of the apertures, the greater the sound power produced. As belt 26 contacts the surface of rim 22b, the belt deforms slightly over the apertures creating sound. The synchronous sound generated modifies the engine sound perceived by the listener.

Those skilled in the art will appreciate in view of this disclosure that a tensioner according to the present invention could be employed not only with accessory drive belt systems, but also with camshaft drives, whether of the chain type or belt driven.

We claim:

1. A tensioner assembly for an automotive engine accessory drive belt, comprising:
   a tensioner arm adapted for pivotable mounting to an engine; and
   a drive belt contact pulley mounted on said arm, with said pulley comprising a cup-shaped member with a base and a rim for contacting a drive belt and having a plurality of acoustical apertures formed in the rim.

2. An arm assembly for an automotive engine accessory drive belt tensioner, comprising:
   an arm having first and second ends;
   a tensioner pulley mounted on said first end;
   a movable bearing section integral with said second end, with said bearing section being adapted for engagement with a fixed bearing section carried upon an engine;
   a wound spring mounted at said second end, with said spring having inner and outer ends, with the inner end being operatively connected with said movable bearing section; and
   retainer means at said second end for securing the outer end of said spring such that the outer end is permanently captured within a space defined by said retainer means and said second end such that the outer end of the spring has limited freedom to move rotationally with respect to said arm, and for restraining said outer end of said spring against axial movement with respect to the second end of the arm, with the result that the arm may be disengaged from said fixed bearing section without the outer end of the spring becoming disengaged from the second end of the arm.

3. An arm according to claim 2, wherein said retainer means comprises a generally L-shaped structure having a first leg in contact with the second end of the arm and extending axially along an arc defined by the rotational movement of the outer end of the spring and a second leg extending radially inwardly from said first leg in a direction parallel to, but separated from, the second end of the arm, with said L-shaped structure further comprising an abutment for preventing the spring from unwinding when said arm is removed from an engine.

4. An arm according to claim 2, wherein said pulley comprises a unitary cup-shaped member with a base having a rim depending therefrom for contacting a drive belt, with a plurality of acoustical apertures formed in the rim.

5. An arm assembly for an automotive accessory drive belt tensioner, comprising:
   an arm having first and second ends;
   a tensioner pulley mounted on said first end;
   a movable bearing section integral with said second end, with said bearing section being adapted for engagement with a fixed bearing section carried upon an engine;
   a wound spring mounted at the second end of the arm, with said spring having inner and outer ends, with the inner end being operatively connected with said movable bearing section; and
   retainer means integral with said arm for securing the outer end of said spring, and for preventing said outer end from unwinding and moving axially with respect to the second end of the arm prior to attachment of the arm to an engine.

6. A tensioner assembly for an automotive engine accessory drive belt, comprising:
   a tensioner arm having first and second ends;
   a pulley mounted on said first end;
   a movable bearing section integral with said second end, with said bearing section being adapted for engagement with a fixed bearing section carried upon an engine;
   a fixed bearing section which is integral with a cover adapted to enclose part of an engine;
   a wound spring mounted at said second end, with said spring having inner and outer ends, with the inner end being operatively connected with said movable bearing section; and
   retainer means, including abutment means, at said second end for securing the outer end of said spring such that the outer end is permanently captured within a space defined by said retainer means and said second end such that the outer end has limited freedom to move rotationally with respect to said arm, and for retaining said outer end of said spring against axial movement with respect to the second end of the arm, with the result that the arm may be disengaged from said fixed bearing section without the outer end of the spring becoming disengaged from the second end of the arm.

7. A tensioner according to claim 6, further comprising a spring anchor carried upon said cover such that the anchor engages the outer end of the spring and reacts with the spring so as to urge the outer end of the spring away from the abutment means of said retainer.

8. A tensioner according to claim 6, wherein said pulley comprises a cup-shaped member with a base and a rim for contacting a drive belt and having a plurality of acoustical apertures formed in the rim.

* * * * *